United States Patent [19]

Ohki

[11] Patent Number: 4,881,217
[45] Date of Patent: Nov. 14, 1989

[54] METHOD OF MAKING OPTICALLY RECORDED INFORMATION MEDIUM BY EXPOSURE TO ULTRAVIOLET LIGHT

[75] Inventor: Hiroshi Ohki, Kanagawa, Japan

[73] Assignee: Sony Corporation, Tokyo, Japan

[21] Appl. No.: 847,719

[22] PCT Filed: Jul. 12, 1985

[86] PCT No.: PCT/JP85/00393

§ 371 Date: Mar. 18, 1986

§ 102(e) Date: Mar. 18, 1986

[87] PCT Pub. No.: WO86/01020

PCT Pub. Date: Feb. 13, 1986

[30] Foreign Application Priority Data

Jul. 18, 1984 [JP] Japan ................................ 59-149044

[51] Int. Cl.⁴ ............................................. G11B 3/00
[52] U.S. Cl. ..................................... 369/132; 283/89; 283/904
[58] Field of Search ....................... 235/454, 487, 488; 430/962, 945, 345, 321, 314; 369/100, 101, 132, 284–286, 288; 283/89, 904

[56] References Cited

U.S. PATENT DOCUMENTS 3,687,664 8/1972 Broadbent ........................... 430/314
3,832,547 8/1974 Silverman .......................... 250/319
3,872,445 3/1975 Pease .................................. 364/900
3,954,469 5/1976 Avanzado et al. ................. 369/275
4,034,211 7/1977 Horst et al. ........................ 235/454
4,565,779 1/1986 Arakawa et al. ................... 430/962

Primary Examiner—Aristotelis M. Psitos
Assistant Examiner—James E. Tomassini
Attorney, Agent, or Firm—Hill, Van Santen, Steadman & Simpson

[57] ABSTRACT

The present invention relates to a method of making an optically recorded information medium which permits the reduction of the number of the processing steps and the reproduction of the recorded medium at a reasonable cost and in large quantities. The method comprises the steps of preparing a recording medium which comprises a substrate (16), a light reflecting layer (17) and a recording layer (18), recording information by exposing the recording layer to ultraviolet rays, cutting the recording medium to make an information stripe (23), and fixing the information stripe on a supporting plate (24). When the recording layer is exposed, the recording medium is forwarded intermittently for repeating exposure. The supporting plate may preferably be in the form of a rigid card, and a transparent protective film may optionally be provided on the recording layer.

6 Claims, 3 Drawing Sheets

METHOD OF MAKING OPTICALLY RECORDED INFORMATION MEDIUM BY EXPOSURE TO ULTRAVIOLET LIGHT

TECHNICAL FIELD

The present invention relates to a method of making an optically recorded information medium, and more particularly it is concerned with a method of making an optically recorded information medium which permits a mass reproduction at a reasonable cost and which is useful, for example, as an optical card.

BACKGROUND ART

In an optical card 1 as shown in FIG. 5, the format of recorded information is such that a main track 3 consists of a multitude of subtrack row 2, information being formed according to the presence or absence of dots thereon as shown in FIG. 6 in an enlarged view.

Several methods have been employed heretofore for reproducing recorded medium having the same information as the optical card 1 in large quantities by means of a mask having a pattern of the main track 3. For example, a first method utilizes a photoresist and an etching, where the recorded medium obtained therein has a construction that a photoresist 6 having a desired information pattern and a light reflecting layer 7 are formed on a substrate 5 and further a protective film 8 is provided thereon, as shown, for example, in FIG. 7. Then, a second method known heretofore is such that a pattern of a glossy silver 9 is formed on a substrate 5 by exposing and developing a silver emulsion in a desired pattern, and a protective film 8 is then formed thereon as shown, for example, in FIG. 8 (Japanese Pat. Laid-Open No. 49296/1981, for example). Further, a third method is that in which a photoresist exposed and developed in a predetermined pattern is plated to form a rugged stamper, and an optical card is reproduced by press method using the stamper.

The first method described above is disadvantageous in that the etching process is time-consuming and the controllability of a large surface card is poor. The second method described above is disadvantageous because silver used therein is expensive. In addition, both the first and second methods above require many steps as well as a wet process. The third method is superior in mass productivity to the first and second methods, but it is still disadvantageous in that information recording density is not raised enough because the contrast is obtained by a phase method where rugged dots are formed, the resulting regenerative output being therefore differential, and because the tolerance of defocus is small.

In view of the foregoing, the present invention provides a method of making optically recorded information medium which permits the reproduction in large quantities and at a reasonable cost as well.

DISCLOSURE OF THE INVENTION

A method of making an optically information medium relating to the present invention comprises the steps of:

preparing an optical information recording medium consisting of a substrate, a light reflecting layer, and a recording layer formed on the light reflecting layer for recording information according to the difference of optical density between exposed portion and non-exposed portion by selective exposure to ultraviolet rays;

exposing the recording layer to ultraviolet rays through a mask for exposure having a predetermined recording pattern;

cutting the recording medium including the portion of the recording layer which has recorded the recording pattern, to make an information stripe; and fixing the information stripe on a supporting plate.

The recording medium described above may be a flexible and continuous tape, and when the recording layer is exposed to ultraviolet rays, the recording medium may be forwarded intermittently for repeating exposure.

The supporting plate may be a rigid, card-like plate of, for example, a plastic. A protective film may be optionally provided on the recording layer.

The recording layer may be a film prepared from the mixture of a material which shows photochromism upon irradiation with ultraviolet rays and a polymeric binder. The material showing photochromism may be spiropyran compounds, tetraheterofluvalene derivatives, anthracene, glass containing silver halides, hexacarbonyl compounds of metals such as Cr, Mo and W. Preferably, the polymeric binder is of high polarity because it provides a slow fading rate of a colored state of the exposed portion in the recording layer, and such binders include a phenoxide resin, a vinyl chloride-vinyl acetate copolymer, polyvinylidene chloride, polyvinyl butyral and the like.

The substrate includes an acrylic resin, polyvinyl chloride, various polyolefin resins, glass, ceramics and the like.

As the light reflecting layer may be used, for example, a metallic foil or deposited film of aluminum, silver and the like.

The protective film which can optionally be used includes a transparent plastic material such as polymethyl methacrylate, polyethylene, polypropyrene, polyvinyl chloride and a vinyl chloride-vinyl acetate copolymer.

BEST MODE FOR CARRYING OUT THE INVENTION

A method of making optically information recorded medium according to the present invention will now be described by way of examples with reference to the drawings.

EXAMPLE 1

Figure 1:
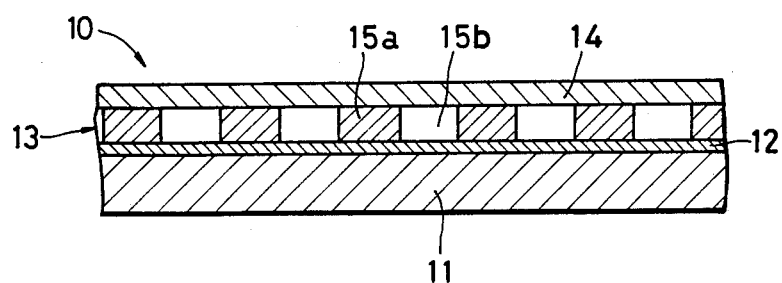
FIG. 1 is a sectional view of one embodiment of the information stripe obtained according to the method of the present invention.

FIG. 1 illustrates an example of the information stripe 10 obtained by the method of the present invention, in which the information stripe 10 has a construction that a light reflecting layer 12 consisting of a deposited film of aluminum is provided on a card substrate 11 of a polyvinyl chloride and a recording layer 13, in which information is recorded, and a protective film 14 of a transparent acrylic resin are laminated in this order on the light reflecting layer 12.

The recording layer 13 is formed by coating on the light reflecting layer 12 a benzothiazoline spiropyran compound represented by formula (I)

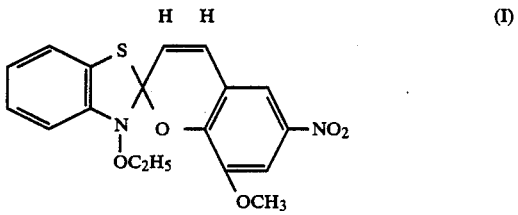

and dissolved together with a phenoxy resin in a solvent and then drying it.

The information recorded in the recording layer 13 is obtained by a process, in which a mask having an information pattern for defining colored portions 15a and uncolored portions 15b is kept in close contact with the protective film 14, and the recording layer 13 is then irradiated through the mask with the ultraviolet rays having a wavelength of about 360 nm to color the spiropyran compound of the formula (I) in the recording layer 13. The light absorption spectra of the compound of the formula (I) before and after the irradiation with ultraviolet rays are shown in FIG. 2.

Figure 2:
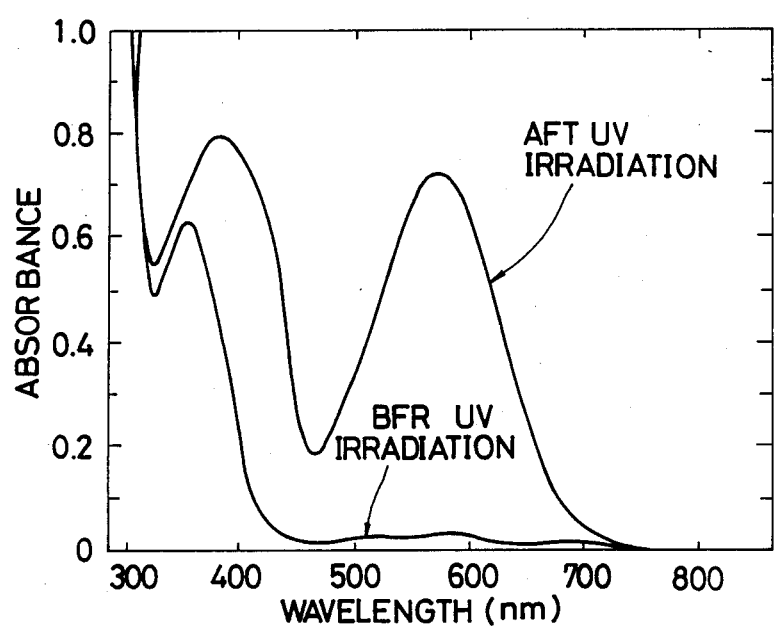
FIG. 2 is graphs showing the absorbances of the recording layer of the recording medium of FIG. 1 before and after irradiation with ultraviolet rays.

It can be seen from FIG. 2 that the recording layer 13 of the information stripe 10 so formed has, for example, transmittance of 0.52 for the light having a wavelength of 630 nm. Accordingly, when the information pattern of the recording layer 13 is reproduced with the 630 nm light, the transmittance of the light resulting from its going and returning is $(0.52)^2 = 0.27$, and the contrast between the colored portion 15a and the uncolored portion 15b in the recording layer 13 will be 0.57 from the following calculations, assuming that the reflectivity of the light reflecting layer 12 is R:

$(1.0R - 0.27R)/(0.27R + 1.0R) = 0.57.$

This value is greater than 0.5 which is the level generally necessary for reproducing the information stripe and, therefore, the information stripe 10 is suitable for practical use.

So far, in applying a phtochromic material as a recording layer in the recording medium, the recording has been carried out in such a manner that the recording layer is colored with ultraviolet rays, and is then returned to its colorless state with visible or infrared laser beam according to the information to be recorded, and, therefore, there has been a disadvantage that, when a photosensitivity in coloration of the photochromic material, and in particular, of spiropyran compound is increased, the stability of the colored state is deteriorated. However, the information stripe formed according to this example has an advantage that, since it is not necessary to return the colored state to the colorless state for recording, the compound of the formula (I) can be selected as a photochromic substance, paying attention only to the stability of the colored state.

EXAMPLE 2

In this Example a method of making recorded medium using a recording medium having a flexible substrate will be described with reference to FIG. 3 and FIG. 4.

Figure 3:
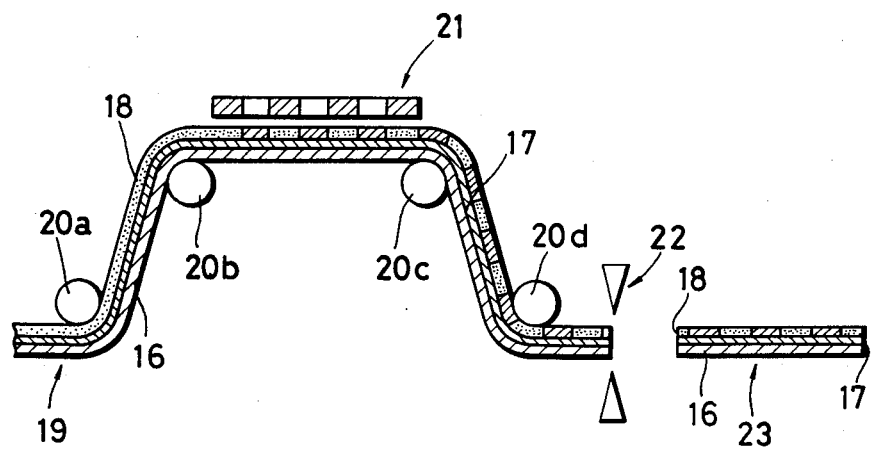
FIG. 3 and FIG. 4 are explanatory drawings of the method according to the present invention.
Figure 4:
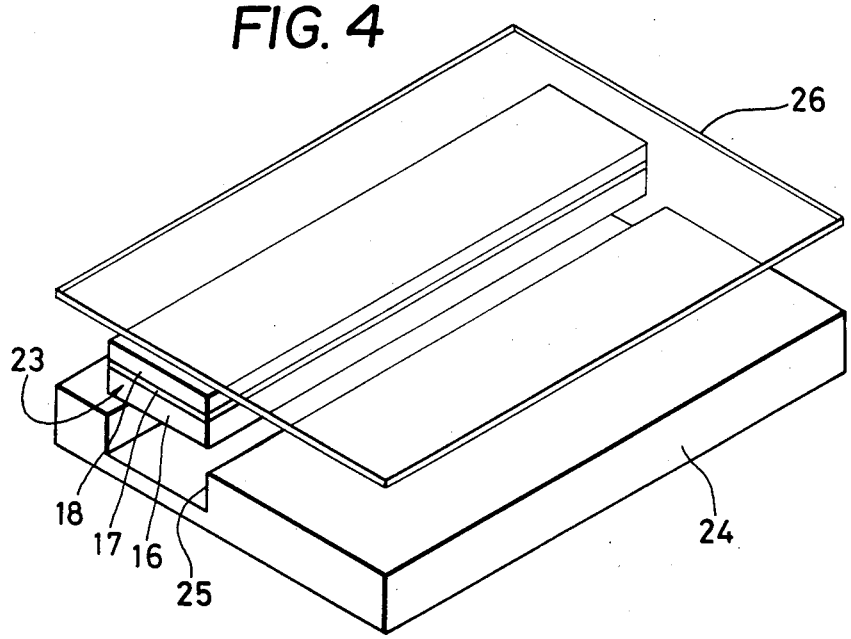
Figure 5:
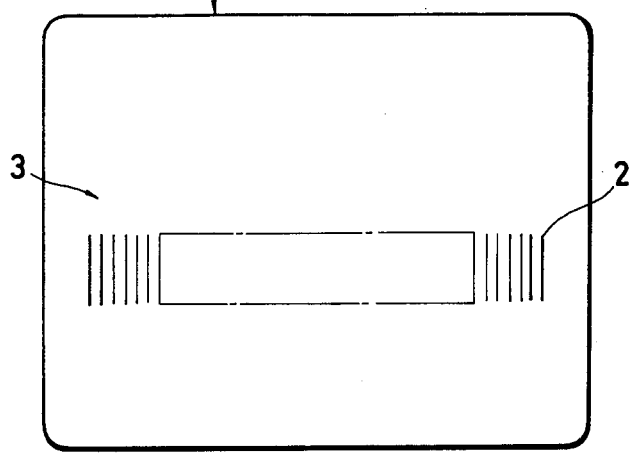
FIG. 5 is a plan view showing a conventional, optical card.
Figure 6:
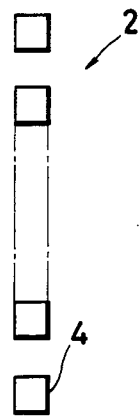
FIG. 6 is an enlarged view of a subtrack of the optical card of FIG. 5.
Figure 7:
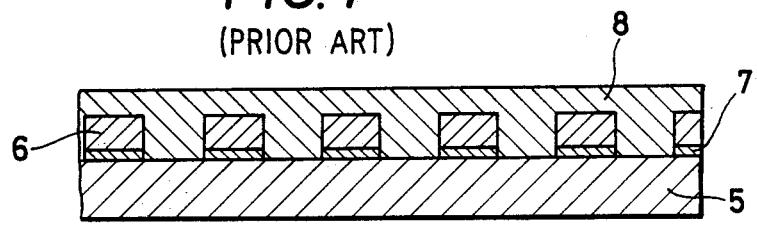
FIG. 7 and FIG. 8 are the sectional views of the conventional optical cards.
Figure 8:
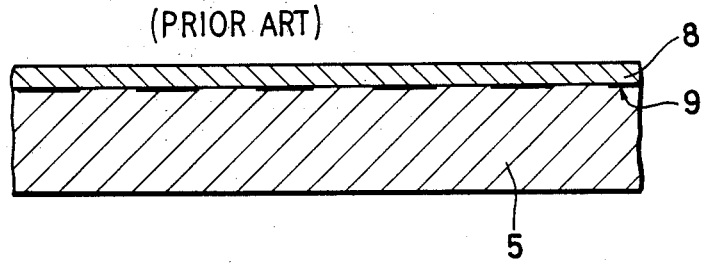

As illustrated in FIG. 3, a continuous tape-like material 19 having a deposited silver film as a light reflecting layer 17 on a substrate 16 consisting of a flexile and continuous tape-like sheet of polyvinyl chloride, and a recording layer 18 which is formed on the light reflecting layer 17 as in Example 1, is passed on rollers 20a to 20d. A mask 21 on which information to be recorded is formed as in Example 1, is placed closely above the portion of the tape-like material 19 between the rollers 20b and 20c. The tape-like material 19 is forwarded intermittently by the predetermined length and exposed through the mask 21 to record the predetermined information on the recording layer 18, and it is then cut by a cutter 22 to obtain an information stripe 23. The stripe 23 is then inserted and bonded in a groove 25 formed on a supporting plate 24 of a polyethylene resin shown in FIG. 4. A transparent thin film of polymethyl methacrylate is laminated as a protective film 26 on the supporting plate 24 including the information stripe 23 to obtain a final recording medium or an optical card.

INDUSTRIAL APPLICABILITY

According to the method of making optically recorded information medium of the present invention, when information having the same content is reproduced in large quantities, the reproduction of the recorded medium will be effected at a reasonable cost because a wet process is not required and the number of processing steps can be reduced as compared with the conventional method.

What is claimed is:

1. A method of making an optically recorded information medium, which comprises the steps of:

preparing an optical information recording medium consisting of a substrate, a light reflecting layer and a recording layer formed on the light reflecting layer for recording information according to the difference in optical density between exposed portions and non-exposed portions caused by selective exposure to ultraviolet rays;

exposing said recording layer to unfocused ultraviolet rays through a mask for exposure having a predetermined recording pattern, to form a continuous recording layer having portions of different optical density;

cutting the recording medium including the portion of the recording layer which has recorded the said information, to make an information stripe; and fixing the information stripe on a supporting plate, whereby the difference in optical density between said exposed and non-exposed portions form a visible indication of said information when viewed in light reflected from said light reflecting layer.

2. The method according to claim 1, wherein the recording medium is forwarded intermittently for repeating exposure.

3. The method according to claim 1, wherein the supporting plate is rigid and card-like.

4. The method according to claim 1, wherein a transparent protective film is provided on the recording layer prior to exposure.

5. The method according to claim 1, wherein the recording layer contains a photochromic material of a spiropyran compound.

6. The method according to claim 1, wherein said ultraviolet rays simultaneously cover an area of said mask to simultaneously record information over an area in said recording layer.

* * * * *